(12) United States Patent
Chen et al.

(10) Patent No.: US 12,056,940 B2
(45) Date of Patent: Aug. 6, 2024

(54) TRANSFORMER-BASED DRIVER DISTRACTION DETECTION METHOD AND APPARATUS

(71) Applicant: Anhui University, Hefei (CN)

(72) Inventors: Jie Chen, Hefei (CN); Haitao Wang, Hefei (CN); Bing Li, Hefei (CN); Zihan Cheng, Hefei (CN); Jingmin Xi, Hefei (CN); Yingjian Deng, Hefei (CN)

(73) Assignee: Anhui University, Hefei (CN)

( * ) Notice: Subject to any disclaimer, the term of this patent is extended or adjusted under 35 U.S.C. 154(b) by 343 days.

(21) Appl. No.: 17/662,796

(22) Filed: May 10, 2022

(65) Prior Publication Data

US 2023/0186652 A1 Jun. 15, 2023

(30) Foreign Application Priority Data

Dec. 10, 2021 (CN) .......................... 202111509227.5

(51) Int. Cl.
*G06V 20/59* (2022.01)
*B60W 40/09* (2012.01)
*G06T 7/10* (2017.01)

(52) U.S. Cl.
CPC .......... *G06V 20/597* (2022.01); *B60W 40/09* (2013.01); *G06T 7/10* (2017.01);
(Continued)

(58) Field of Classification Search
CPC ............. G06T 7/10; G06T 2207/20084; G06T 2207/30268; B60W 40/09; B60W 2420/403
See application file for complete search history.

(56) References Cited

PUBLICATIONS

Chu, X., Tian, Z., Wang, Y., Zhang, B., Ren, H., Wei, X., . . . & Shen, C. (2021). Twins: Revisiting the design of spatial attention in vision transformers. Advances in neural information processing systems, 34, 9355-9366. (Year: 2021).*

(Continued)

*Primary Examiner* — David Perlman
(74) *Attorney, Agent, or Firm* — DLA PIPER LLP (US)

(57) ABSTRACT

The present disclosure provides a transformer-based driver distraction detection method and apparatus, belonging to the field of driving behavior analysis. The method includes: acquiring districted driving image data; building a driver distraction detection model FPT; inputting the acquired distracted driving image data into the driver distraction detection model FPT, analyzing the distracted driving image data by using the driver distraction detection model FPT, and determining a driver distraction state according to an analysis result. The present disclosure proposes a new network model, i.e., a driver distraction detection model FPT, based on Swin, Twins, and other models. Compared with a deep learning model, the FPT model compensates for the drawback that the deep learning model can only extract local features; the FPT model improves the classification accuracy and reduces the parameter quantity and calculation amount compared with the transformer model. The present disclosure adjusts the loss function of the whole network and adds label smoothing to the cross-entropy loss function, to increase the accuracy of classification, effectively suppress overfitting, and improve the detection accuracy.

17 Claims, 4 Drawing Sheets

(52) U.S. Cl.
CPC ............... *B60W 2420/403* (2013.01); *G06T 2207/20084* (2013.01); *G06T 2207/30268* (2013.01)

(56) References Cited

PUBLICATIONS

Wang, W., Xie, E., Li, X., Fan, D. P., Song, K., Liang, D., . . . & Shao, L. (2021). Pyramid vision transformer: A versatile backbone for dense prediction without convolutions. In Proceedings of the IEEE/CVF international conference on computer vision (pp. 568-578). (Year: 2021).*

* cited by examiner

TRANSFORMER-BASED DRIVER DISTRACTION DETECTION METHOD AND APPARATUS

CROSS REFERENCE TO RELATED APPLICATION

This application claims priority to Chinese Patent Application No. 202111509227.5, filed Dec. 10, 2021, which is herein incorporated by reference in its entirety.

TECHNICAL FIELD

The present disclosure relates to the field of driving behavior analysis, and in particular, to a transformer-based driver distraction detection method and apparatus.

BACKGROUND ART

Global Status Report on Road Safety 2018, published by the World Health Organization (WHO), states that road traffic fatalities continue to rise, reaching 1.35 million deaths per year. The Global Status Report on Road Safety 2015, published by the WTO, shows that 1.25 million people died in traffic accidents worldwide in 2013. Many countries have been successful in reducing road traffic fatalities over the past few years, but situations vary significantly in different countries and regions. The overall number of deaths has also increased from 2013 to 2018, and the number of road traffic deaths has not decreased in any low-income countries. This shows that road safety is getting far from enough attention. Most of the current research focuses on whether drivers are distracted or not, rather than the types of distractions. Moreover, with few publicly available distraction datasets, driver distractions are not diverse enough to simulate real driving scenes. If distraction types of drivers can be detected in time, car manufacturers and developers can design cars with more comprehensive emergency avoidance measures based on different distraction types to improve driving safety.

Through research, it is found that driver distraction detection is mainly based on two methods currently: machine learning and convolutional neural network (CNN). However, feature extraction using the machine learning method relies on personal experience, with poor robustness, difficult feature transfer, and poor model generalization capabilities. Feature extraction using the CNN has been improved but still has the following drawbacks: first, parameters of the CNN, such as dimensionality, convolutional kernel, and step size, need to be set manually, and it is also necessary to change these parameters in the present disclosure according to different input images. Secondly, feature extraction is performed on the whole image, and as the network deepens, the computational complexity increases. Thirdly, the convolution kernel slides over each image to extract features, which can only focus on local features of the image, thus losing key global information of the image. Especially, for a driver distraction detection task, the behavioral performance of the driver is strongly correlated with a global driving scene, and the CNN-based architecture lacks the global capture capability.

In recent years, the transformer has received wide attention and developed rapidly in computer vision, and it has shown superior performance in optical image classification, target detection, and semantic segmentation on par with or even beyond the CNN, but has not been studied and explored in the field of driver distraction detection. Therefore, embodiments of the present disclosure innovatively propose a driver distraction detection method based on the integration of transformer and CNN, which is referred to as a driver distraction detection model FPT, to solve the problems of the existing CNN-based architecture.

SUMMARY

To overcome the deficiencies in the prior art, the present disclosure provides a transformer-based driver distraction detection method and apparatus.

To achieve the objective above, the present disclosure provides the following technical solutions.

A transformer-based driver distraction detection method includes the following steps:
  acquiring distracted driving image data;
  building a driver distraction detection model FPT, including:
    with a Twins transformer as a basic framework, integrating the transformer with a convolutional neural network (CNN) to form a main architecture;
    optimizing the main architecture, including: adding a residual embedding module to the main architecture and embedding the residual embedding module into a transformer encoder; changing sizes of image segmentation blocks and input dimensionality of a feature map through the residual embedding module; replacing a multilayer perceptron (MLP) in the main architecture with a group convolution; and adding a label-smooth cross-entropy loss function to the main architecture;
    sequentially connecting a plurality of optimized main architectures to form the driver distraction detection model FPT; and
  inputting the acquired distracted driving image data into the driver distraction detection model FPT, analyzing the distracted driving image data by using the driver distraction detection model FPT, and determining a driver distraction state according to an analysis result.

Preferably, the distracted driving image data in different driving scenes is acquired by using an in-vehicle camera.

Preferably, in the transformer-based driver distraction detection method, the driver distraction state includes: a driver texting with left/right hand, talking on the phone with left/right hand holding the phone, operating a radio, drinking, looking backwards, fixing hair, and talking to a passenger.

Preferably, before the distracted driving image data is analyzed by using the driver distraction detection model FPT, the distracted driving image data is preprocessed, where the specific process includes:
  performing a data enhancement operation on an image, converting the image into a tensor, and then performing normalization.

Preferably, the parameter quantity of the group convolution is calculated using the following formula:

$$F = h_1 \times w_1 \times c_1 \times c_2 \times \frac{1}{g}$$

where $h_1$ is a height of an input image; $w_1$ is a width of the input image; $c_1$ is the number of channels of the image; $c_2$ is the number of channels of a convolution kernel; $g$ represents the number of groups of the convolution kernel, and the parameter quantity after the group convolution is only 1/g of an original parameter quantity.

Preferably, in the cross-entropy loss function, a smoothed label y' is:

$$y' = \begin{cases} 1-\varepsilon & \text{if } i = y \\ \varepsilon/(K-1) & \text{otherwise} \end{cases}$$

where ! is a constant, and 1/(K−1) is a noise probability distribution.

Preferably, the driver distraction detection model FPT includes four optimized main architectures, which divide a detection process of the distracted driving image data into four stages.

Preferably, feature mapping dimensions embedded by the residual embedding module in the four stages are 64, 128, 256, and 512 respectively.

Preferably, a distraction detection result obtained by analyzing the distracted driving image data by using the driver distraction detection model FPT is used for assisting a driver in safe driving.

The present disclosure further provides a driver distraction detection apparatus, including a memory, a processor, and a computer program stored in the memory and operable on the processor, where the processor implements the steps of the foregoing method when executing the computer program.

The transformer-based driver distraction detection method provided by the present disclosure has the following beneficial effects:

(1) The present disclosure proposes a new network model based on Swin, Twins, CNN, and other models of a vision transformer, namely, a driver distraction detection model FPT. The FPT model is used to handle the task of driver distraction detection. Compared with a deep learning model, the FPT model compensates for the draw back that the deep learning model can only extract local features; the FPT model improves the classification accuracy and reduces the parameter quantity and calculation amount compared with the transformer model. This method is the first exploration in the field of driver distraction detection, and its effectiveness is verified on a large-scale driver distraction detection dataset.

(2) Based on the Twins model, the present disclosure makes structural adjustments, adds a residual connection module, reconstructs an embedded transformer encoder module, and builds a transformer-oriented feature pyramid structure, thereby improving the global and local feature extraction capability in a balanced way. Moreover, the MLP is replaced with a lightweight group convolution to reduce the parameter quantity and calculation amount.

(3) The present disclosure adjusts the loss function of the whole network and adds label smoothing to the cross-entropy loss function, to increase the accuracy of classification, effectively suppress overfitting, and improve the detection accuracy.

BRIEF DESCRIPTION OF THE DRAWINGS

In order to illustrate the embodiments and design solutions of the present disclosure more clearly, accompanying drawings of the embodiments will be briefly introduced below. The accompanying drawings in the following description show merely some embodiments of the present disclosure, and other drawings may be derived from these accompanying drawings by a person of ordinary skill in the art without creative efforts.

DETAILED DESCRIPTION OF THE EMBODIMENTS

To enable those skilled in the art to better understand and implement the technical solutions of the present disclosure, embodiments of the present disclosure are described below in detail with reference to the accompanying drawings and specific embodiments. The following embodiments are only used for describing the technical solutions of the present disclosure more clearly, and are not intended to limit the protection scope of the present disclosure.

Embodiment 1

To solve the problems of the existing CNN architecture, inspired by Swin, Twins and other Vit models, embodiments of the present disclosure integrate respective advantages of the CNN and vision transformer to provide a transformer-based driver distraction detection method. This method is referred to as a driver distraction detection model FPT for short. This method is the first exploration in the field of driver distraction detection, and its effectiveness is verified on a large-scale driver distraction detection dataset.

The driver distraction detection model FPT mainly includes the following components: introducing a Twins transformer as a basic framework; adding a residual connection module, and reconstructing an embedded encoder module; replacing an MLP module, and introducing a lightweight group, to reduce the amount of calculation.

Figure 1:
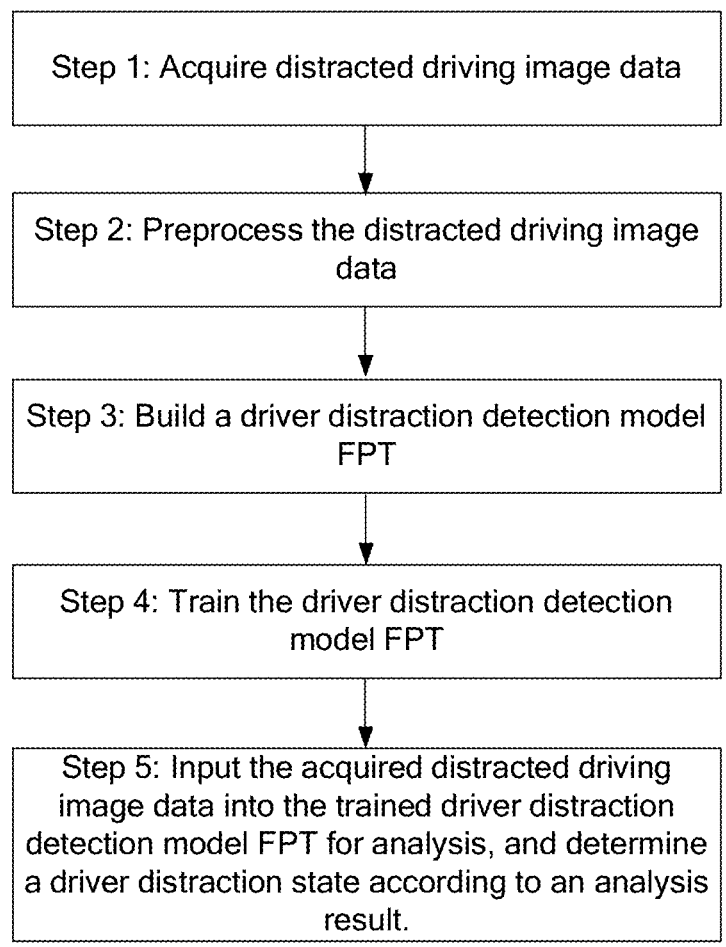
FIG. 1 is a flowchart of a transformer-based driver distraction detection method according to Embodiment 1 of the present disclosure.

Embodiments of the present disclosure are further described in detail below with reference to the accompanying drawings and specific embodiments. As shown in FIG. 1, the transformer-based driver distraction detection method includes the following steps:

Step 1: Acquire distracted driving image data.

In this embodiment, the distracted driving image data in different driving scenes is acquired by using an in-vehicle camera, which specifically includes acquiring a driver distraction dataset including 2489 images of normal driving. 2267 images of texting with right hand. 2317 images of talking on the phone with right hand holding the phone. 2346 images of texting with left hand. 2326 images of talking on the phone with left hand holding the phone. 2312 images of operating a radio. 2325 images of drinking. 2002 images of looking backwards. 1911 images of fixing hair, and 2129 images of talking to a passenger. There are 22424 images in total.

Step 2: Pre-process the distracted driving image data, where a specific process is as follows:

An input RGB image is a 3-channel image. A data enhancement operation is first performed on the image, including rescaling the size of the image to 222×224 and randomly rotating the image by 10 degrees. Then, the image is converted into a tensor and normalization is performed, to input the tensor into the model.

Step 3: Build a driver distraction detection model FPT, which includes the following process:

With a twins transformer as a basic framework, the transformer is integrated with a CNN to form a main architecture.

The main architecture is optimized by adding a residual embedding module to the main architecture and embedding the residual embedding module into a transformer encoder, where the residual embedding module is used to change sizes of image segmentation blocks and input dimensionality of a feature map; replacing an MLP in the main architecture with a group convolution; and adding a label-smoothing cross-entropy loss function to the main architecture. To increase the accuracy of model classification, a label smoothing strategy is used. Label smoothing is a strategy to change normalization of a target vector so that a prediction result of the model is not either 1 or 0, to reduce a weight of a true label category during calculation of the loss function and avoid overfitting of the model, thus making the classification model more accurate. Therefore, label smoothing is introduced into the cross-entropy loss.

$$y = \begin{cases} 1-\varepsilon & \text{if } i = y \\ \varepsilon/(K-1) & \text{otherwise} \end{cases} \quad (1)$$

where y is a smoothed label, ε is a small constant, and 1/(K−1) can be regarded as introducing noise into a probability distribution. After the smoothed cross-entropy loss is introduced, the calculation result is not 1 or 0, but ε and 1−ε. This approach allows the model to be calibrated to prevent overconfidence of the model, increases the probability of correct classification of the model, and decreases the probability to incorrect probability.

A plurality of optimized main architectures are connected to form the driver distraction detection model FPT.

Figure 2:
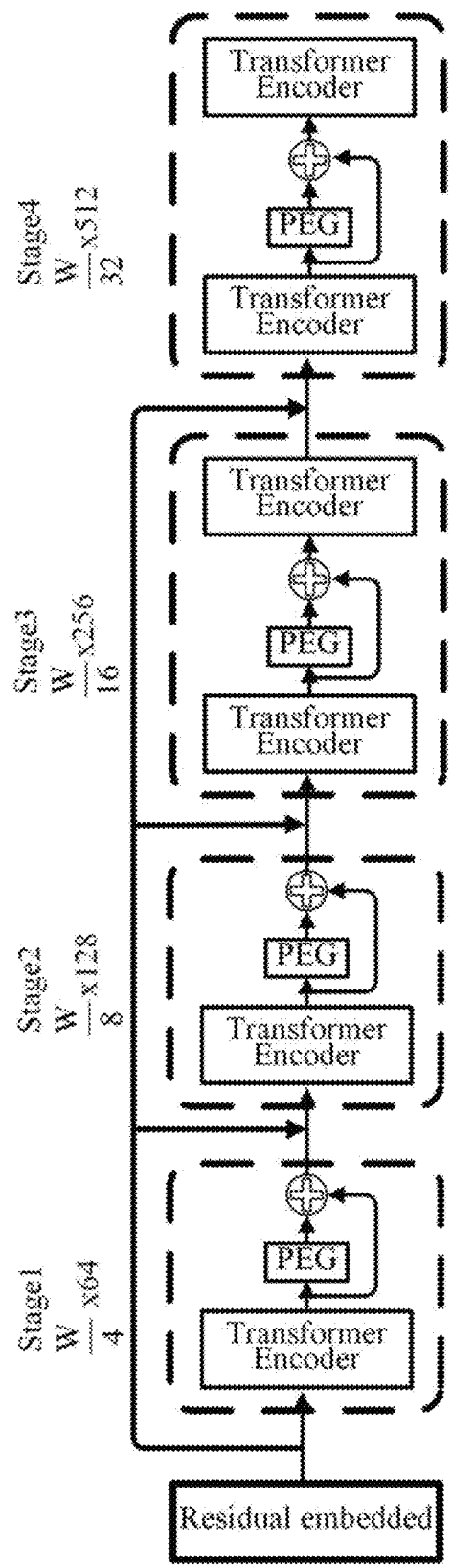
FIG. 2 is an overall structural block diagram of a driver distraction detection model FPT.
Figure 4:
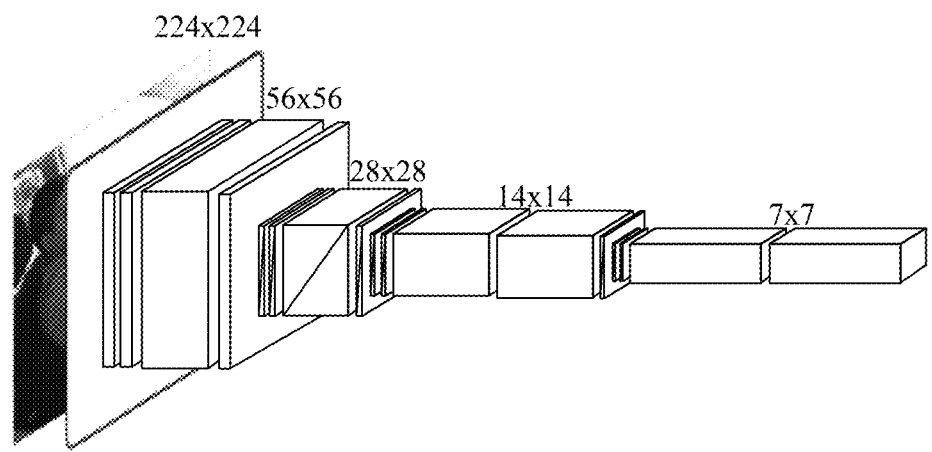
FIG. 4 is a three-dimensional effect diagram of a driver distraction detection model FPT according to the present disclosure.

The overall structure of the driver distraction detection model FPT provided by the present disclosure is shown in FIG. 2, which includes four stages. In each stage, the sizes of image segmentation blocks and the input dimensionality of the feature map are changed by residual embedding. The dimensions of embedding in the four stages are 64, 128, 256 and 512 respectively. Then, the residual is fed into the transformer encoder, and the output encoder is added with a positional encoding generator (PEG) and fed to the next stage. The overall structure is in a shape of a stacked pyramid, as shown in FIG. 4.

Figures 3A, 3B:
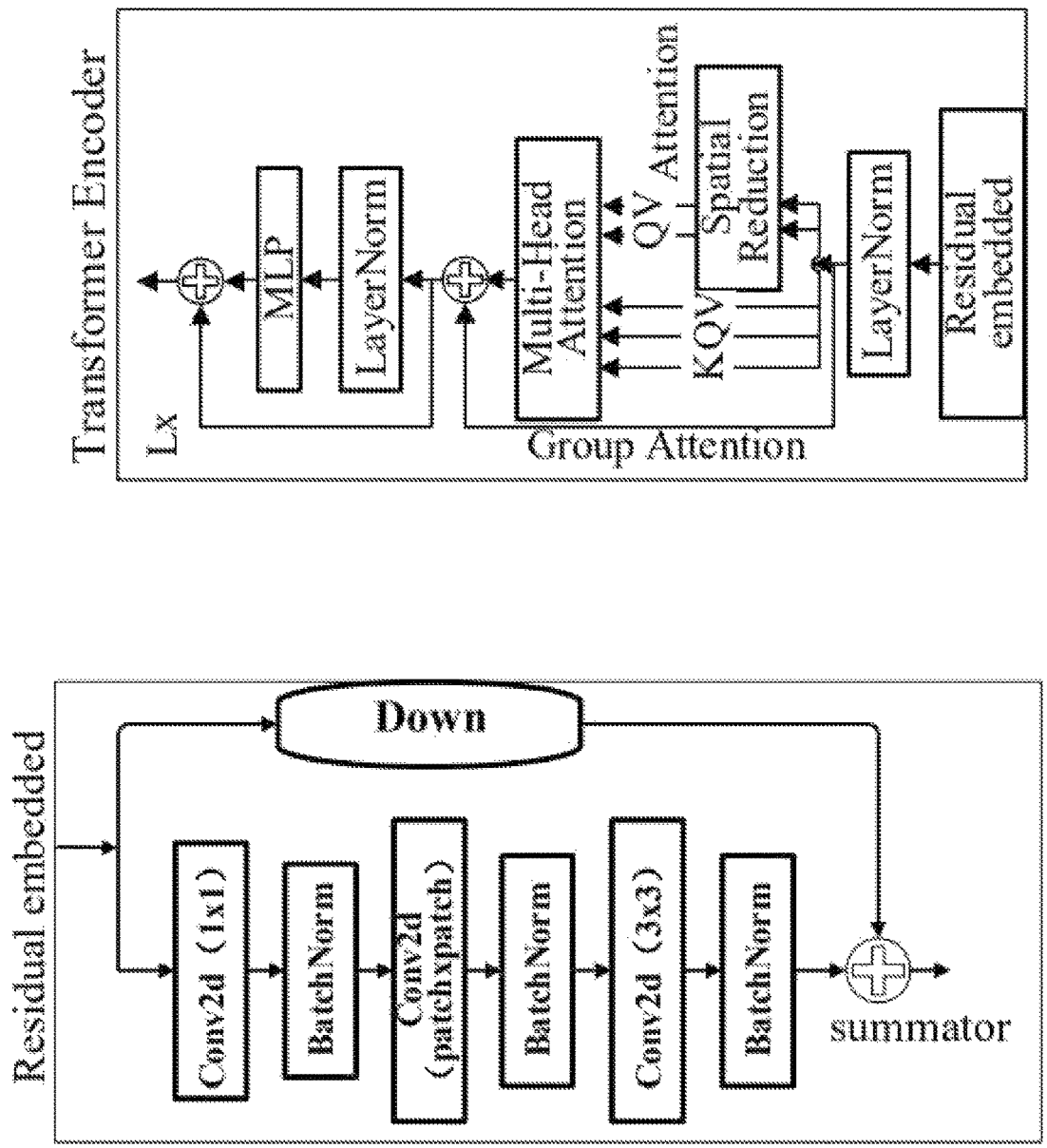
FIG. 3A is a structural diagram of a residual structure and FIG. 3B is a transformer encoder in a model according to the present disclosure.

Building of the model mainly includes the following steps:

(1) Residual connection: Based on Twins, the present disclosure adds a CNN architecture, and the overall structure is shown in FIG. 3A. First, an input image is a 3×224×224 three-channel image. In the present disclosure, convolutional feature extraction is first performed on the input image, where a convolutional kernel and a step size of the first-layer convolution are set to 1, and the size of an obtained feature map is still 3×224×224. A convolutional kernel and a step size of the second-layer convolution are set to patches. The patches of the first stage are 4, and the patches of the second, third and fourth stages are 2. The feature map obtained from the first-layer convolution is mapped into a feature map with a size of 64×56×56 by the second convolution. For the feature map at this point, convolutional feature extraction is performed again in the present disclosure, where a convolutional kernel and step size of the third convolution are set to 1. After each convolution layer, batch normalization (BN) is performed in the present disclosure. Finally, in the present disclosure, downsampling is performed on the input image; a downsampling result and the result of the convolutional output are added together and fed into an activation function. After such a residual structure of the CNN, the output of the present disclosure is now 64×64×56×56, which is a four-dimensional tensor. After the dimensional transformation, the present disclosure converts the four-dimensional tensor into a three-dimensional tensor: B, N, C, i.e. B, 3136, 64, where B is a batchsize. Then, the three-dimensional tensor is fed into the transformer encoder.

(2) Transformer encoder: the structure of the transformer encoder is shown in FIG. 3B. After the residual embedding process, the data is subject to a layer normalization (LN) operation, and then a group attention operation is performed. Next, residual summation is carried out with the data involved in the first LN operation. The resulting data is then subjected to a second LN operation and an MLP. Finally, residual summation is performed again. The difference is an attention operation is performed in the next encoder. The attention here also inherits some of the improvements made in a pyramid vision transformer (PVT) for multi-head attention. The lengths of Q, K, and V are usually the lengths of input data sequences, but after the dimensionality reduction of K and V, the lengths and widths of the feature map are reduced to $$\frac{1}{R^2}$$

of the previous ones, and the calculation formula of the attention becomes as follows:

$$\text{Attention}(Q, K, V) = \text{soft max}\left(\frac{Q^T K}{R^2 \sqrt{d_k}} V\right) \quad (2)$$

Such a calculation approach greatly reduces the calculation amount. There are four blocks in one transformer encoder; the group attention operation and the attention operation are performed alternately, and the same operations are performed in the next three stages.

The Twins MLP module uses two fully connected layers. The driver distraction detection model FPT of the present disclosure uses two lightweight convolutional layers. The input x is a 3-dimensional tensor, which is transformed into a 4-dimensional tensor and fed into a convolutional layer with a kernel size of 1 and a step size of 1 in the present disclosure. The convolutional dimensions are first expanded to 4 times the original dimensions, and then reduced to the original dimensions. After two layers of convolutions, the present disclosure converts the 4-dimensional tensor into a 3-dimensional tensor for output. The fully connected layer is characterized in that each neuron is connected to all neurons in the previous layer, which is convenient and simple to use, but involves a large calculation amount and parameter quantity. As is known to all, the convolutional layers are characterized by sparse connections and shared weights. More importantly, present disclosure uses a group convolution to further reduce the computation amount and parameter quantity. If the size of the input feature map is $H \times W \times c_1$ and the size of the convolution kernel is $h_1 \times w_1 \times c_1$, the size of the output feature map is $H \times W \times c_2$. The parameter quantities corresponding to the fully connected layer, convolution, and group convolution are calculated as follows:

$$F = h_1 \times w_1 \times c_1 \times C \quad (3)$$

$$F = h_1 \times w_1 \times c_1 \times c_2 \quad (4)$$

$$F = h_1 \times w_1 \times \frac{c_1}{g} \times \frac{c_2}{g} \times g = h_1 \times w_1 \times c_1 \times c_2 \times \frac{1}{g} \quad (5)$$

In formula (3), C represents that a feature map is expanded into a one-dimensional vector, which is much larger than $c_2$; g represents the number of groups, and the parameter quantity after the group convolution is only 1/g of the original parameter quantity; the same principle applies to the calculation amount.

(3) Positional encoding generator (PEG): The output of the encoder is mapped to the dimension size of the input of the next stage by convolution, and then added to the output of the previous encoder. This operation is equivalent to obtaining the PEG of the feature information. The output of the PEG is then used as the input of the next stage of the model. Compared with the PVT, Twins has made a great improvement in position encoding. In the present disclosure, it is shown that the conditional position encoding (namely, PEG) can improve the classification accuracy compared with the relative and absolute position encoding.

The transformer model uses layer normalization, and after the layer normalization, the residual module is further required. There is no direct connection between the two transformer encoders. Therefore, the gradient flow may be blocked by the layer normalization module. The gradient is calculated as follows:

$$\frac{\partial L}{\partial \omega_1} = \prod_i^N \omega_i * x \quad (6)$$

Since $\omega_i$ is relatively small, it is difficult to update parameters of the top layer, which will eventually lead to gradient disappearance. In the residual connection, $\omega_i$ becomes $\omega_i + 1$ which avoids the problem of gradient disappearance, and the CNN residual structure added in the present disclosure has the same effect.

(4) The output of the PEG is added with the output of transformer encoder and inputted to the transformer encoder of the next stage, thus completing the model construction.

Step 4: Train the driver distraction detection model FPT, where driver distraction data is divided into training data and validation data, and the training data is used to train the built model.

The dataset is divided based on the ratio of training:validation=7:3. The model of the present disclosure is implemented using pytorch, and optimized with Adam optimizer; a batch size is 16; an initial learning rate is 0.0001, and the learning rate decreases by 0.1 times after every 100 epochs. A total of 400 epochs are trained.

The model is trained until convergence, and weights of the model are saved. The model is tested with the validation set, to obtain a model with the highest accuracy, i.e., the driver distraction detection model.

Step 5: Input the acquired distracted driving image data into the trained driver distraction detection model FPT, analyze the distracted driving image data by using the driver distraction detection model FPT, and determine a driver distraction state based on an analysis result, where a distraction detection result is used to assist a driver in safe driving.

An embodiment of the present disclosure further provides a driver distraction detection apparatus, including a memory, a processor, and a computer program stored in the memory and operable on the processor, where the processor implements the steps of the foregoing method when executing the computer program. The apparatus may be a vehicle-mounted development board.

The network model proposed in the present disclosure is trained on a large-scale driver distraction detection dataset, and trained weights are saved. Then, the trained model and weights are transplanted to deep learning to develop a specific detection process, including: performing data enhancement by using a driver distraction detection model, which includes rescaling a size of an image, randomly rotating the image by 10 degrees, then converting the image into a high-dimensional tensor, and performing normalization. Next, the tensor is fed into an entry of the model. The high-dimensional tensor is mapped to 64 dimensions through a residual connection, and fed into the transformer encoder for feature extraction. The output of the encoder is mapped to the dimension size of the input of the next stage by convolution, and then added to the output of the previous encoder. This operation is equivalent to obtaining the PEG of the feature information. The output of the PEG is then used as the input of the next stage of the model. A vehicle equipped with such a development board can detect whether a driver is distracted in real time, determine a distraction type, and remind the driver to drive safely.

The above are merely preferred specific embodiments of the present disclosure, and the scope of protection of the present disclosure is not limited to this. All simple variations or equivalent substitutions of the technical solution readily obtained by any person skilled in the art within the technical scope disclosed by the present disclosure should fall within the protection scope of the present disclosure.

What is claimed is:

1. A transformer-based driver distraction detection method, comprising the following steps:
    acquiring distracted driving image data;
    building a driver distraction detection model FPT, comprising:
        with a Twins transformer as a basic framework, integrating the transformer with a convolutional neural network (CNN) to form a main architecture;
        optimizing the main architecture, comprising: adding a residual embedding module to the main architecture and embedding the residual embedding module into a transformer encoder; changing sizes of image segmentation blocks and input dimensionality of a feature map through the residual embedding module; replacing a multilayer perceptron (MLP) in the main architecture with a group convolution; and adding a label-smooth cross-entropy loss function to the main architecture;
        sequentially connecting a plurality of optimized main architectures to form the driver distraction detection model FPT; and
    inputting the acquired distracted driving image data into the driver distraction detection model FPT, analyzing the distracted driving image data by using the driver distraction detection model FPT, and determining a driver distraction state according to an analysis result.

2. The transformer-based driver distraction detection method according to claim 1, wherein the distracted driving image data in different driving scenes is acquired by using an in-vehicle camera.

3. The transformer-based driver distraction detection method according to claim 2, wherein the driver distraction state comprises: a driver texting with left/right hand, talking on a phone with left/right hand holding the phone, operating a radio, drinking, looking backwards, fixing hair, and talking to a passenger.

4. The transformer-based driver distraction detection method according to claim 2, wherein before the distracted driving image data is analyzed by using the driver distraction detection model FPT, the distracted driving image data is preprocessed, which specifically comprises:
performing a data enhancement operation on an image, converting the image into a tensor, and then performing normalization.

5. The transformer-based driver distraction detection method according to claim 1, wherein a parameter quantity of the group convolution is calculated based on the following formula:

$$F = h_1 \times w_1 \times c_1 \times c_2 \times \frac{1}{g}$$

wherein $h_1$ is a height of an input image; $w_1$ is a width of the input image; $c_1$ is a number of channels of the image; $c_2$ is the number of channels of a convolution kernel; g represents the number of groups of the convolution kernel, and the parameter quantity after the group convolution is only 1/g of an original parameter quantity.

6. The transformer-based driver distraction detection method according to claim 1, wherein in the cross-entropy loss function, a smoothed label y' is:

$$y = \begin{cases} 1 - \varepsilon & \text{if } i = y \\ \varepsilon/(K-1) & \text{otherwise} \end{cases}$$

wherein $\varepsilon$ is a constant, and 1/(K−1) is a noise probability distribution.

7. The transformer-based driver distraction detection method according to claim 4, wherein the driver distraction detection model FPT comprises four optimized main architectures, which divide a detection process of the distracted driving image data into four stages.

8. The transformer-based driver distraction detection method according to claim 7, wherein feature mapping dimensions embedded by the residual embedding module in the four stages are 64, 128, 256, and 512 respectively.

9. The transformer-based driver distraction detection method according to claim 8, wherein a distraction detection result obtained by analyzing the distracted driving image data by using the driver distraction detection model FPT is used for assisting a driver in safe driving.

10. A driver distraction detection apparatus, comprising a memory, a processor, and a computer program stored in the memory and operable on the processor, wherein the processor implements the steps of the method according to claim 1 when executing the computer program.

11. The driver distraction detection apparatus according to claim 10, wherein the distracted driving image data in different driving scenes is acquired by using an in-vehicle camera.

12. The driver distraction detection apparatus according to claim 11, wherein the driver distraction state comprises: a driver texting with left/right hand, talking on a phone with left/right hand holding the phone, operating a radio, drinking, looking backwards, fixing hair, and talking to a passenger.

13. The driver distraction detection apparatus according to claim 11, wherein before the distracted driving image data is analyzed by using the driver distraction detection model FPT, the distracted driving image data is preprocessed, which specifically comprises:
performing a data enhancement operation on an image, converting the image into a tensor, and then performing normalization.

14. The driver distraction detection apparatus according to claim 10, wherein a parameter quantity of the group convolution is calculated based on the following formula:

$$F = h_1 \times w_1 \times c_1 \times c_2 \times \frac{1}{g}$$

wherein $h_1$ is a height of an input image; $w_1$ is a width of the input image; $c_1$ is a number of channels of the image; $c_2$ is the number of channels of a convolution kernel; g represents the number of groups of the convolution kernel, and the parameter quantity after the group convolution is only 1/g of an original parameter quantity.

15. The driver distraction detection apparatus according to claim 10, wherein in the cross-entropy loss function, a smoothed label y' is:

$$y = \begin{cases} 1 - \varepsilon & \text{if } i = y \\ \varepsilon/(K-1) & \text{otherwise} \end{cases}$$

wherein $\varepsilon$ is a constant, and 1/(K−1) is a noise probability distribution.

16. The driver distraction detection apparatus according to claim 13, wherein the driver distraction detection model FPT comprises four optimized main architectures, which divide a detection process of the distracted driving image data into four stages.

17. The driver distraction detection apparatus according to claim 16, wherein feature mapping dimensions embedded by the residual embedding module in the four stages are 64, 128, 256, and 512 respectively.

\* \* \* \* \*